United States Patent

Shiraishi et al.

(10) Patent No.: US 9,573,621 B2
(45) Date of Patent: Feb. 21, 2017

(54) POWER STEERING APPARATUS FOR VEHICLE AND METHOD OF PRODUCING THE SAME

(71) Applicant: HONDA MOTOR CO., LTD, Tokyo (JP)

(72) Inventors: Takehito Shiraishi, Wako (JP); Yutaka Arimura, Wako (JP); Takashi Miyoshi, Wako (JP); Yasuo Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/674,192

(22) Filed: Mar. 31, 2015

(65) Prior Publication Data

US 2015/0274204 A1    Oct. 1, 2015

(30) Foreign Application Priority Data

Mar. 31, 2014   (JP) ................................. 2014-072969

(51) Int. Cl.
| | |
|---|---|
| *B62D 6/10* | (2006.01) |
| *G01L 5/22* | (2006.01) |
| *G01L 3/10* | (2006.01) |
| *B62D 1/16* | (2006.01) |

(52) U.S. Cl.
CPC . *B62D 6/10* (2013.01); *B62D 1/16* (2013.01); *G01L 3/102* (2013.01); *G01L 5/221* (2013.01); *Y10T 29/4902* (2015.01)

(58) Field of Classification Search
CPC ............. B62D 6/10; B62D 1/16; G01L 3/102; G01L 5/221; Y10T 29/4902
See application file for complete search history.

(56) References Cited

U.S. PATENT DOCUMENTS

| 8,011,256 | B2 * | 9/2011 | Yoneda | G01L 3/102 |
| | | | | 29/595 |
| 8,479,376 | B2 * | 7/2013 | Shimizu | G01L 3/102 |
| | | | | 29/592.1 |
| 2002/0117348 | A1 * | 8/2002 | Shimizu | B62D 5/0406 |
| | | | | 180/443 |
| 2007/0240523 | A1 * | 10/2007 | Yoneda | G01L 3/102 |
| | | | | 73/862.333 |

(Continued)

FOREIGN PATENT DOCUMENTS

JP   2013-233879 A   11/2013

*Primary Examiner* — Drew Brown
(74) *Attorney, Agent, or Firm* — Westerman, Hattori, Daniels & Adrian, LLP

(57) ABSTRACT

A power steering apparatus for a vehicle includes a column shaft, a column pipe rotatably supporting the column shaft through a plurality of bearings, and a torque sensor for detecting torque generated on the column shaft by using magnetism. The column pipe is composed of a steel pipe. The torque sensor includes a magnetically variable portion and a magnetic change detector. The magnetically variable portion is disposed on the column shaft and has a magnetic permeability that varies with the torque generated on the column shaft. The magnetic change detector is configured to detect a change in the magnetism of the magnetically variable portion. The magnetic change detector is attached to the column pipe by being inserted in an axial direction through an opening at an axial end of the column pipe.

10 Claims, 8 Drawing Sheets

(56) References Cited

U.S. PATENT DOCUMENTS

| | | | | |
|---|---|---|---|---|
| 2007/0283767 A1* | 12/2007 | Watanabe | ............... | G01L 5/221 |
| | | | | 73/862.331 |
| 2007/0295111 A1* | 12/2007 | Shimizu | ................... | B62D 6/10 |
| | | | | 73/862.333 |
| 2008/0053250 A1* | 3/2008 | Yoneda | ................... | G01L 3/102 |
| | | | | 73/862.333 |
| 2009/0218162 A1* | 9/2009 | Miyoshi | ................... | G01L 3/105 |
| | | | | 180/443 |
| 2012/0018241 A1* | 1/2012 | Shimizu | ................... | B62D 6/10 |
| | | | | 180/443 |
| 2012/0137789 A1* | 6/2012 | Arimura | ................... | B62D 6/10 |
| | | | | 73/862.335 |

* cited by examiner

POWER STEERING APPARATUS FOR VEHICLE AND METHOD OF PRODUCING THE SAME

CROSS REFERENCES TO RELATED APPLICATIONS

The present application claims priority under 35 U.S.C. §119 to Japanese Patent Application No. 2014-72969, filed Mar. 31, 2014, entitled "Power Steering Apparatus for Vehicle and Method of Producing the Same." The contents of this application are incorporated herein by reference in their entirety.

BACKGROUND

1. Field

The present disclosure relates to an improved technique relating to a power steering apparatus for a vehicle and a method of producing the same. The power steering apparatus includes a torque sensor for detecting the amount and direction of torque acting on the column shaft (steering shaft) connected to the steering wheel.

2. Description of the Related Art

Examples of the power steering apparatus for a vehicle include an electric power steering apparatus. The electric power steering apparatus detects a steering torque generated on the column shaft (steering shaft), which is connected to the steering wheel, at a torque sensor, and generates an auxiliary torque corresponding to the steering torque, which is combined with the steering torque, at an electric motor. Thus, the electric power steering apparatus reduces the workload of a driver.

To simplify the configuration of the electric power steering apparatus, a technology using a magnetostrictive torque sensor, for example, has been developed in recent years. Particularly, an electric power steering apparatus configured to transmit auxiliary torque to the column shaft is called a column-assist electric power steering apparatus. Such a column-assist electric power steering apparatus is disclosed in Japanese Unexamined Patent Application Publication No. 2013-233879, for example.

The technology described in Japanese Unexamined Patent Application Publication No. 2013-233879 includes a steering wheel, a column shaft connected to the steering wheel, a column pipe rotatably supporting the column shaft through a plurality of bearings, and a torque sensor configured to detect a steering torque generated on the column shaft by using magnetism.

The torque sensor includes a magnetostrictive film disposed on an outer peripheral surface of the column shaft, an excitation coil, and a detection coil, which are disposed around the magnetostrictive film. The magnetostrictive film, which is a magnetically variable portion (a magnetostrictive portion), has, due to an inverse magnetostrictive effect, magnetostriction which varies with the steering torque generated on the column shaft. The detection coil, which is a magnetic change detector, detects a change in the magnetism of the magnetostrictive film.

The detection coil is housed inside a lower end portion of a cylindrical sensor housing. An upper end portion of the sensor housing is connected to a lower end portion of a column pipe. In other words, the detection coil is not surrounded by the column pipe. The column shaft is supported at an upper end portion of the column pipe by upper bearings and supported at the lower end portion of the sensor housing by lower bearings.

The torque sensor disclosed in Japanese Unexamined Patent Application Publication No. 2013-233879 is likely to be affected by outside magnetic noise. To improve and stabilize the detection accuracy of the torque sensor, the magnetic noise should be reduced as much as possible so as not to affect the torque sensor. To reduce the effect of the magnetic noise, the torque sensor may be magnetically shielded by a magnetic shield.

However, magnetically shielding the torque sensor by using the magnetic shield increases the number of components. The increased number of components makes the configuration of the torque sensor complex and increases the cost and the weight of the torque sensor. Thus, the torque sensor requires further improvement.

SUMMARY

The present application describes a technique for providing a lighter torque sensor that is unlikely to be affected by outside magnetic noise at a lower cost by employing a simple configuration.

According to a first aspect of the present application, a power steering apparatus for a vehicle includes a steering wheel, a column shaft connected to the steering wheel, a column pipe rotatably supporting the column shaft through a plurality of bearings, and a torque sensor for detecting torque generated on the column shaft by using magnetism. The column pipe is a steel pipe. The torque sensor includes a magnetically variable portion and a magnetic change detector. The magnetically variable portion is disposed on the column shaft and has a magnetic permeability that varies with the torque generated on the column shaft. The magnetic change detector is configured to detect a change in the magnetism of the magnetically variable portion. The magnetic change detector is attached to the column pipe by being inserted in an axial direction through an opening at an axial end of the column pipe.

According to the first aspect of the present application, an outer peripheral surface of the magnetic change detector included in the torque sensor is surrounded by the steel column pipe. The column pipe not only serves as a supporting member that supports the column shaft, but also serves as a magnetic shield made of a magnetic material. The column pipe blocks the outside magnetic noise from reaching the magnetic change detector. Accordingly, the magnetic change detector is unlikely to be affected by the outside magnetic noise. Thus, the detection accuracy of the torque sensor is improved and stabilized. In addition, the magnetic change detector is attached to the column pipe simply by being inserted into the steel column pipe in the axial direction through the opening at the axial end of the column pipe. A separate member such as yoke, which surrounds the magnetic change detector, is not needed. This simple configuration provides a lighter torque sensor that is unlikely to be affected by the outside magnetic noise at a lower cost.

According to a second aspect of the present application, the magnetic change detector is integrally molded with at least one of the bearings with resin.

According to the second aspect of the present application, at least one of the bearings, which supports the column shaft, and the magnetic change detector are integrally molded with resin. This improves position accuracy of the axis of the magnetic change detector (coaxial position accuracy) with respect to the axis of the bearing. Thus, the detection accuracy of the torque sensor is further improved and stabilized.

According to a third aspect of the present application, a method of producing the power steering apparatus includes in sequence attaching the column shaft and the magnetic change detector to each other, and inserting and attaching the column shaft and the magnetic change detector, which are attached to each other, to the column pipe. In one embodiment, the method of producing the power steering apparatus above includes providing the column shaft to which the magnetostrictive portion is provided, the column pipe, and the detector as set forth. The detector is mounted to the column shaft at a position where the magnetostrictive portion is provided, thereby assembling the torque sensor with magnetostrictive portion and the detector. Thereafter, the column shaft with the torque sensor is inserted into the column pipe through an axial end thereof to a position where the column pipe houses the torque sensor therein.

According to the third aspect of the application, in the assembling of the torque sensor, the magnetic change detector and the column shaft are attached to each other in advance to obtain a semi-finished product. Then, the semi-finished product is inserted and attached to the column pipe. Thus, in the semi-finished product, the magnetic change detector surrounds the magnetically variable portion provided on the column shaft (a magnetostrictive film provided on a surface of the column shaft, for example). With this configuration, the magnetic change detector protects the magnetically variable portion such that the magnetically variable portion is not damaged in the assembling of the torque sensor.

In addition, as described above, the semi-finished product, which is obtained by attaching the magnetic change detector and the column shaft to each other, is inserted and attached to the column pipe. Thus, the center of the magnetic change detector with respect to the column pipe is determined simply by attaching the column shaft to the column pipe through the bearing. This sufficiently improves the assembly accuracy of the torque sensor. Thus, the detection accuracy of the torque sensor is further improved and stabilized.

DESCRIPTION OF THE PREFERRED EMBODIMENTS

Hereinafter, preferred embodiments of the present application will be described with reference to the attached drawings.

First Embodiment

A power steering apparatus for a vehicle according to a first embodiment will be described with reference to the drawings.

Figure 1:
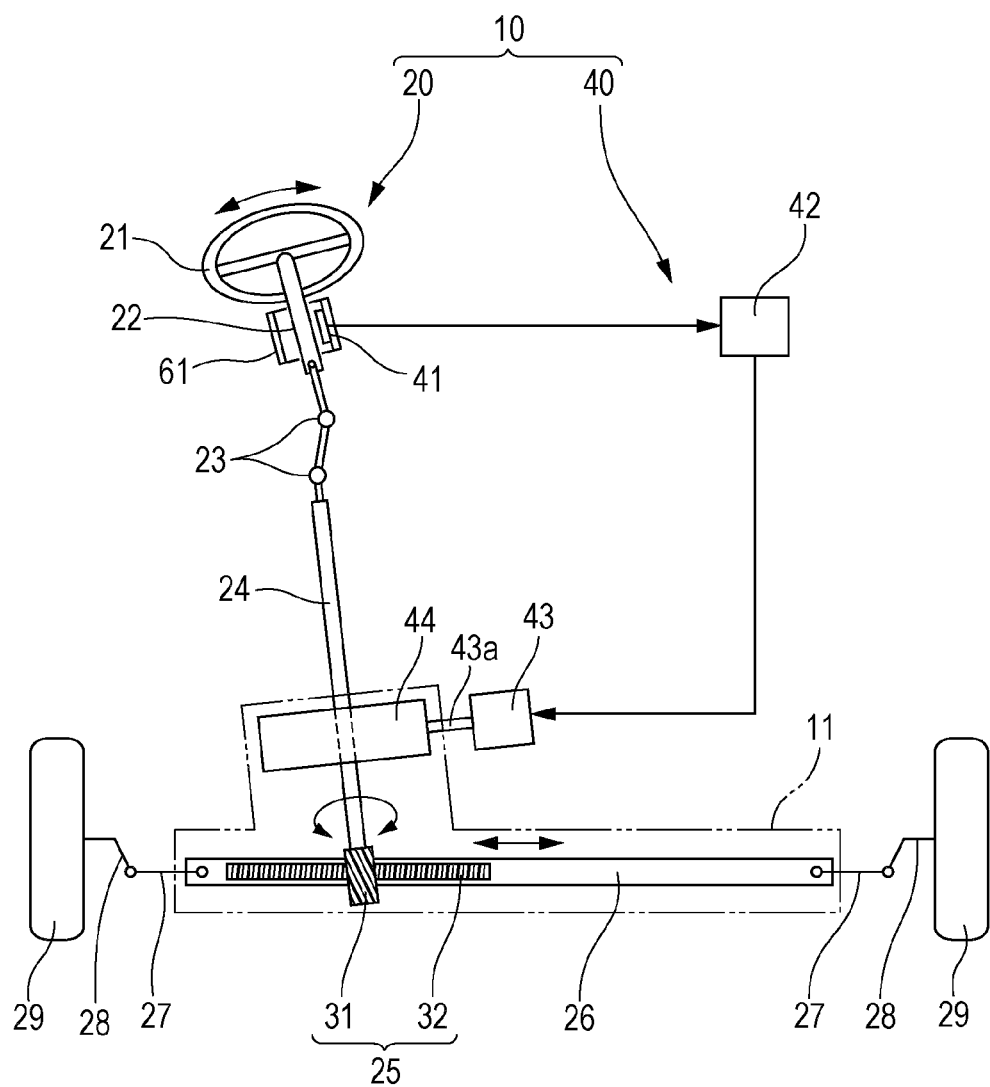
FIG. 1 is a schematic view of a power steering apparatus for a vehicle including a torque sensor according to a first embodiment of this application.

As illustrated in FIG. 1, a power steering apparatus for a vehicle 10 according to the first embodiment is an "electric power steering for a vehicle," which is configured to reduce the workload of a driver. An electric motor 43 thereof generates auxiliary torque that is added to steering torque. Hereinafter, the power steering apparatus for a vehicle 10 will be referred to as a "steering apparatus 10," and the electric motor 43 will be referred to as a "motor 43."

The steering apparatus 10 includes a steering wheel 21 operated by a driver, a column shaft 22 connected to the steering wheel 21, a column pipe 61 rotatably supporting the column shaft 22 through bearings 63, 81 (see FIG. 2), and a torque sensor 41 configured to detect torque (steering torque) generated on the column shaft 22 by using magnetism.

The steering apparatus 10 will be described in more detail. The steering apparatus 10 includes a steering system 20 extending from the steering wheel 21 to road wheels 29, 29 (front road wheels, for example) of the vehicle, and an auxiliary torque mechanism 40 configured to apply the auxiliary torque to the steering system 20.

In the steering system 20, a pinion shaft 24 is connected to the steering wheel 21 through the column shaft 22 and universal joints 23, 23, a rack shaft 26 is connected to the pinion shaft 24 through a rack and pinion mechanism 25, and the road wheels 29, 29 are connected to corresponding ends of the rack shaft 26 through right and left tie rods 27, 27 and knuckles 28, 28.

The rack and pinion mechanism 25 includes a pinion 31 provided on the pinion shaft 24 and a rack 32 provided on the rack shaft 32.

The pinion shaft 24, the rack and pinion mechanism 25, and the rack shaft 26 of the steering system 20 are housed in a gear box 11.

In the steering system 20, right and left road wheels 29, 29 are turned by steering torque, which is generated through operation of the steering wheel 21 by a driver, via the rack and pinion mechanism 25 and right and left tie rods 27, 27.

In the auxiliary torque mechanism 40, a torque sensor 41 detects the steering torque of the steering system 20, which is applied to the steering wheel 12, a controller 42 generates a control signal based on a torque detection signal from the torque sensor 41, the motor 43 generates auxiliary torque according to the steering torque based on the control signal, and a worm gear mechanism 44 transfers the auxiliary torque to the pinion shaft 24. Then, the auxiliary torque is transmitted from the pinion shaft 24 to the rack and pinion mechanism 25.

The worm gear mechanism 44, which is a torque transmission mechanism, includes a worm connected to a motor shaft 43a of the motor 43 and a worm wheel connected to the pinion shaft 24.

In the auxiliary torque mechanism 40, the motor 43 is attached to the gear box 11 and the worm gear mechanism 44 is housed in the gear box 11.

In the steering apparatus 10, the road wheels 29, 29 are turned by composite torque, which is a combination of the steering torque generated by a driver and the auxiliary torque generated by the motor 43, through the rack shaft 26. The steering apparatus 10, which employs a system that transmits the auxiliary torque generated by the motor to the pinion shaft 24, is called a "pinion-assist electric power steering."

Figure 2:
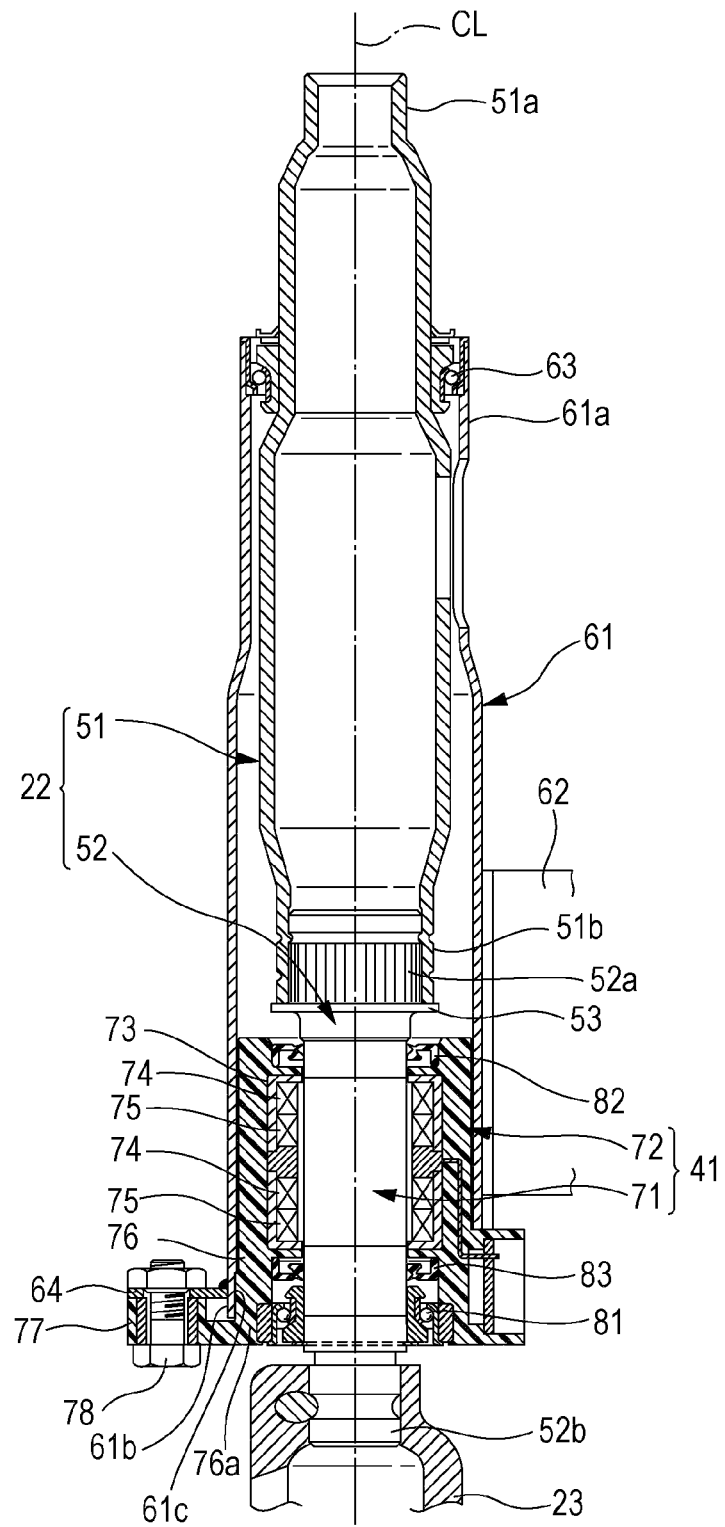
FIG. 2 is a cross-sectional view of a column shaft and a column pipe supporting the column shaft, which are illustrated in FIG. 1.
Figure 3:
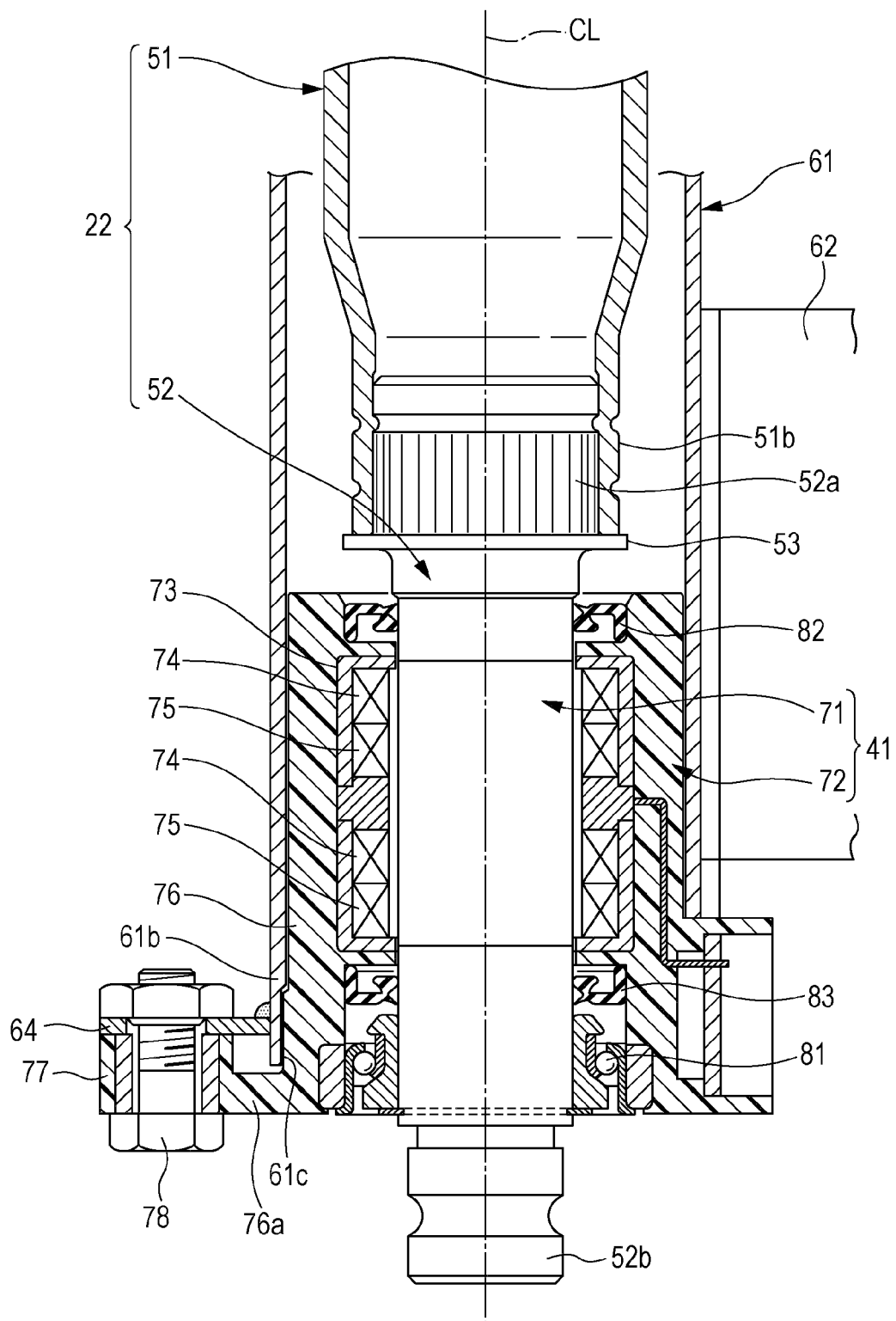
FIG. 3 is a cross-sectional view of the column pipe and a torque sensor housed in the column pipe, which are illustrated in FIG. 2.

The column shaft 22 is also called a steering shaft 22. As illustrated in FIG. 2 and FIG. 3, the column shaft 22 includes two shafts, i.e., a first shaft 51, which is a cylindrical hollow shaft, and a second shaft 52, which is a solid shaft. The first shaft 51 and the second shaft 52 are coaxially arranged to provide an axis CL (a center axis CL) of the column shaft 22.

The steering wheel 21 (see FIG. 1) is connected to a first end portion 51a of the first shaft 51 with limited relative rotation therebetween being allowed. A first end portion 52a of the second shaft 52 is connected to a second end portion 51b of the first shaft 51 with limited relative rotation therebetween being allowed. Specifically, the first shaft 51 and the second shaft 52 are coupled at their serrations. The first end portion 52a of the second shaft 52 has a flange 53 facing an end surface of the second end portion 51b of the first shaft 51. The flange 53 determines the position of the second shaft 52 with respect to the first shaft 51 in the axial (longitudinal) direction. A universal joint 23 is connected to the second end portion 52b of the second shaft 52.

The column shaft 22 is not limited to the configuration including two shafts, i.e., the first shaft 51 and the second shaft 52. The column shaft 22 may include only one shaft.

The column shaft 22 is housed in and supported by a column pipe 61 having a cylindrical pipe shape. Specifically, the column shaft 22 is completely surrounded by the column pipe 61 except for a portion to which the steering wheel 21 is connected (the first end portion 51a of the first shaft 51) and a portion to which the universal joint 23 is connected (the second end portion 52b of the second shaft 52). The column pipe 61 is a steel pipe.

The column pipe 61 is also referred to as a steering column 61. The column pipe 61 is suspended and supported by a steering hanger of the vehicle body, which is not illustrated, via an attachment portion 62. The steering hanger, which extends in a vehicle width direction at a front portion of the vehicle body, is attached to the vehicle body at its ends.

An axis of the column pipe 61 is collinear with the axis CL of the column shaft 22. Inside a first end portion 61a of the column pipe 61 (the portion 61a close to the steering wheel 21), a first bearing 63 is attached. The first shaft 51 of the column shaft 22 is rotatably supported by the column pipe 61 through the first bearing 63. The column pipe 61 integrally includes a flange 64 extending from an outer peripheral surface of a second end 61b thereof (the portion 61b close to the universal joint 23).

The torque sensor 41 detects the steering torque applied to the column shaft 22 as described above, and outputs the detection result as a torque detection signal. The torque sensor 41, which is a magnetostrictive torque sensor, includes a magnetically variable portion 71, in which magnetic permeability varies with the torque generated on the column shaft 22, and a magnetic change detector 72 for detecting the change in the magnetism of the magnetically variable portion 71.

The magnetically variable portion 71 is provided on the column shaft 22. The magnetically variable portion 71 is disposed on an outer peripheral surface of the second shaft 52 of the column shaft 22, for example, and is formed of a magnetostrictive film whose magnetostrictive properties (magnetic properties) vary with the torque. Hereinafter, the magnetically variable portion 71 may be referred to as a "magnetostrictive film 71."

The magnetostrictive film 71 has residual strain in opposite directions in the axial (longitudinal) direction of the second shaft 52. Specifically, the magnetostrictive film 71 is a film made of a material that has a magnetic flux density that markedly changes in accordance with a change in strain. The magnetostrictive film 71 is a Ni—Fe series alloy film, for example, formed on the outer peripheral surface of the second shaft 52 by a vapor plating process. The alloy film preferably has a thickness of about 30 to about 50 μm. The thickness of the alloy film is not limited to the values in the above range. The magnetostrictive film 71 substantially has a constant width and a constant thickness and extends around the outer peripheral surface of the second shaft 52 in a space defined by the column pipe 61.

The Ni—Fe series alloy film that contains about 50% by weight of Ni tends to have a higher magnetostrictive effect, because the magnetostrictive constant thereof is large. Thus, the material having such a Ni content is preferably used. The Ni—Fe series alloy may be made of a material containing 50 to 70% by weight of Ni, and the balance of the alloy material is Fe, for example.

The magnetostrictive film 71 may be any ferromagnetic film and is not limited to the Ni—Fe series alloy film. The magnetostrictive film 71 may be a Co—Fe series alloy film or a Sm—Fe series alloy film, for example.

The magnetic change detector 72 circumferentially surrounds the magnetostrictive film 71, for example, and detects the change in the magnetic permeability of the magnetostrictive film 71. In other words, the magnetic change detector 72 is configured to electrically detect the magnetostrictive effect caused in the magnetostrictive film 71 and output the detection result as a torque detection signal.

An axis of the magnetic change detector 72 is collinear with the axis CL of the column shaft 22. The magnetic change detector 72 includes a coil bobbin 73 positioned radially outward of the magnetostrictive film 71, four coils 74, 74, 75, 75 wound in layers on the coil bobbin 73, and a housing 76 housing the coil bobbin 73 and the coils 74, 74, 75, 75. A gap between the magnetostrictive film 71 and the coil bobbin 73 is within a range of about 0.5 to about 1 mm.

The coils 74, 74 of the coils 74, 74, 75, 75 are excitation coils for applying alternating current to the magnetostrictive film 71. The coils 75, 75 are detection coils for detecting the change in the magnetic permeability of the magnetostrictive film 71. The excitation coils 74, 74 are excited at a frequency within a range of 1 to 100 kHz, for example, at about 10 kHz. The detection coils 75, 75 detect the change in the magnetic permeability of magnetostrictive film 71 having anisotropy.

As indicated in FIG. 1, when a driver steers the steering wheel 21, the column shaft 22 is rotated together with the steering wheel 21. The rotation generates steering torque on the column shaft 22. The torque sensor 41 detects the steering torque. Based on the detected steering torque, the controller 42 (see FIG. 1) activates the motor 43. By the activation of the motor 43, the auxiliary torque is transmitted to the column shaft 22 through the worm gear mechanism 44.

As illustrated in FIG. 2 and FIG. 3, the housing 76 is a plastic cylindrical member and integrally includes a flange 77 extending from the outer peripheral surface of a first end portion 76a (the portion 76a close to the universal joint 23).

The column pipe 61 has an opening 61c at a second end portion 61b thereof. The housing 76 is inserted into the column pipe 61 through the opening 61c in the axial direction to be fitted thereto. Thus, the axis of the housing 76 is collinear with the axis CL of the column shaft 22, and the column pipe 61. The flange 77 of the housing 76 and the flange 64 of the column pipe 61 overlap and are fixed to each other by a bolt 78. As described above, the magnetic change detector 72 is attached to the column pipe 61 by being inserted thereinto in the axial direction through the opening 61c at the axial end of the column pipe 61.

Inside the first end portion 76a of the housing 76, a second bearing 81 is attached. The second shaft 52 of the column shaft 22 is rotatably supported by the column pipe 61 through the second bearing 81 and the housing 76. As described above, the first shaft 51 is rotatably supported by the column pipe 61 through the first bearing 63. That is, the column pipe 61 rotatably supports the column shaft 22 at two positions in the axial direction through the first and second bearings 63, 81.

The magnetostrictive film 71, the coil bobbin 73, and the coils 74, 74, 75, 75 are positioned between the first and second bearings 63, 81. In other words, the torque sensor 41 is substantially positioned between the first and second bearings 63, 81. The first and second bearings 63, 81 are ball bearings, or angular contact bearings, for example.

Spaces defined by the axial ends of the coil bobbin 73 and the column shaft 22 are sealed by oil seals 82, 83. The oil seals 82, 83 are attached to the ends of the housing 76.

Figure 4:
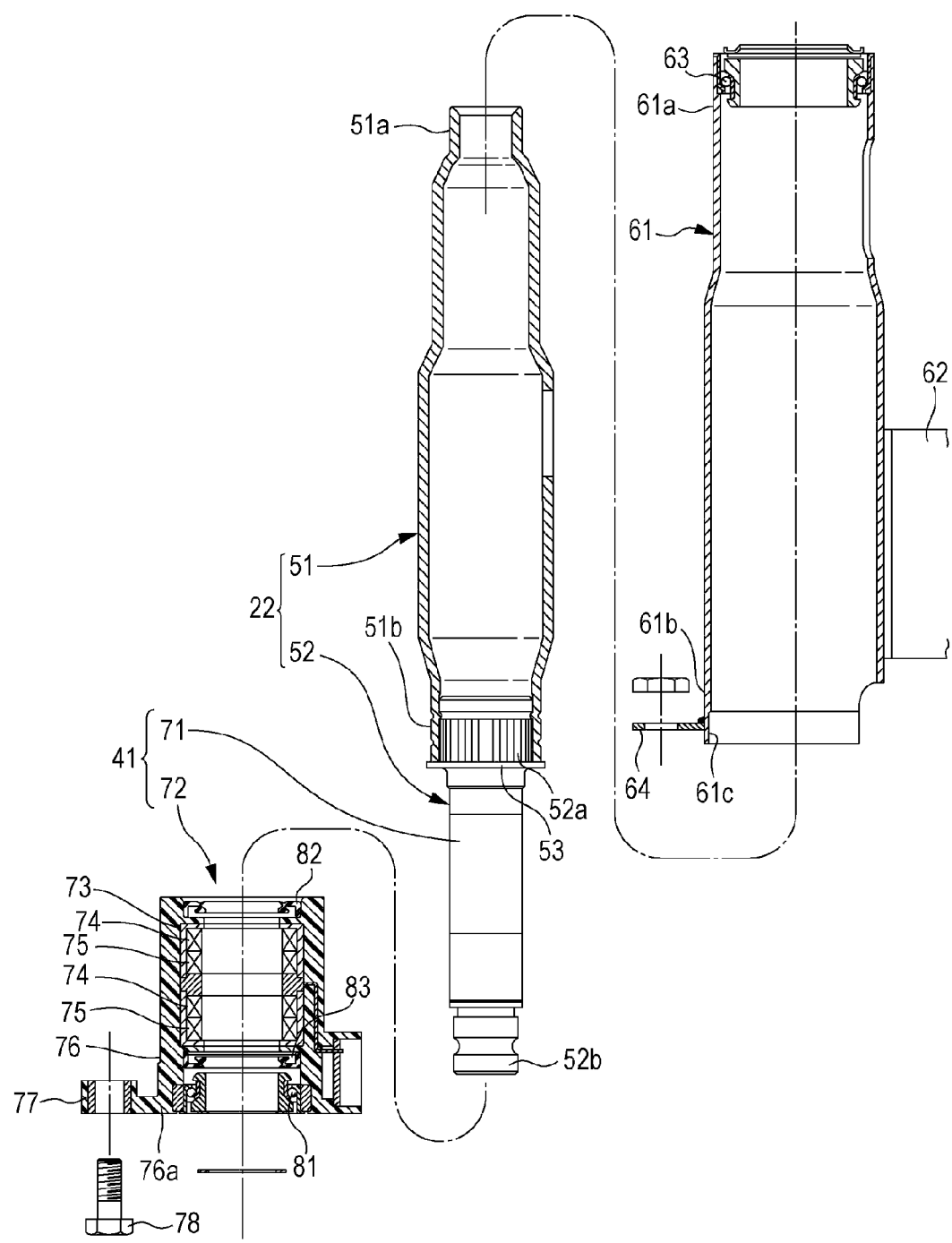
FIG. 4 is an exploded view of the column pipe, the column shaft, and the torque sensor, which are illustrated in FIG. 2.

The magnetic change detector 72 is a molded resin product that is integrally molded with at least one of the bearings 63, 81 (the second bearing 81 in this embodiment). Specifically, when a resin molding of the housing 76 is performed, the coil bobbin 73, the coils 74, 74, 75, 75, and the second bearing 81, which are illustrated in FIG. 3 and FIG. 4, are inserted into a mold. Thus, the coil bobbin 73, the coils 74, 74, 75, 75, and the second bearing 81 are integrally molded with the housing 76 made of resin.

The description of the first embodiment is summarized as below. The auxiliary torque generated by the motor 43 is preferably applied around the right and left road wheels 29, 29 of the steering system 20, as illustrated in FIG. 1, to reduce the torque transmission loss. The torque sensor 41 is preferably positioned upstream of the universal joints 23, 23 of the steering system 20, so as not to be affected by inherent characteristics of the universal joints 23, 23 (such as torque transmission response) and so as to improve the torque detection accuracy.

In the steering apparatus 10 of the first embodiment, the torque sensor 41 is disposed on the steel column pipe 61 (a position close to the steering column) and the motor 43 is attached to the gear box 11 (a position close to the road wheels 29, 29).

As illustrated in FIG. 2 and FIG. 3, the outer periphery of the magnetic change detector 72 of the torque sensor 41 is surrounded by the steel column pipe 61. With this configuration, the column pipe 61 not only serves as a support for the column shaft 22, but also serves as a magnetic shield made of the magnetic material. Thus, the column pipe 61 blocks outside magnetic noise from reaching the magnetic change detector 72. This reduces or eliminates the possibility that the outside magnetic noise will affect the magnetic change detector 72. Thus, the detection accuracy of the torque sensor 41 is improved and stabilized.

The magnetic change detector 72 is attached to the column pipe 61 simply by being inserted into the steel column pipe 61 in the axial direction through the opening 61c at its axial end. In this embodiment, there is no need to provide a yoke, which is another member, to surround the magnetic change detector 72. The lighter torque sensor 41 that is unlikely to be affected by outside magnetic noise is provided at a lower cost by employing the simple configuration.

The magnetic change detector 72 and at least one bearing 81 supporting the column shaft 22 are integrally molded with resin. This improves the positioning accuracy of the axis of the magnetic change detector 72 (coaxial position accuracy) with respect to the axis of the bearing 81. This further improves and stabilizes the detection accuracy of the torque sensor 41.

Next, a method of producing the power steering apparatus 10 will be described. A step of fitting the column shaft 22, the torque sensor 41, and the column pipe 61 in the production of the power steering apparatus 10 will be described below.

First, as illustrated in FIG. 4, the column shaft 22, the magnetic change detector 72, and the column pipe 61 are provided. More specifically, the magnetostrictive film 71 is provided on the outer peripheral surface of the second shaft 52. Then, the second shaft 52 is attached to the first shaft 51 to obtain the completed column shaft 22. In the resin molding process of the housing 76, the coil bobbin 73, the coils 74, 74, 75, 75, and the second bearing 81 are integrally molded to obtain the completed magnetic change detector 72.

Figure 5:
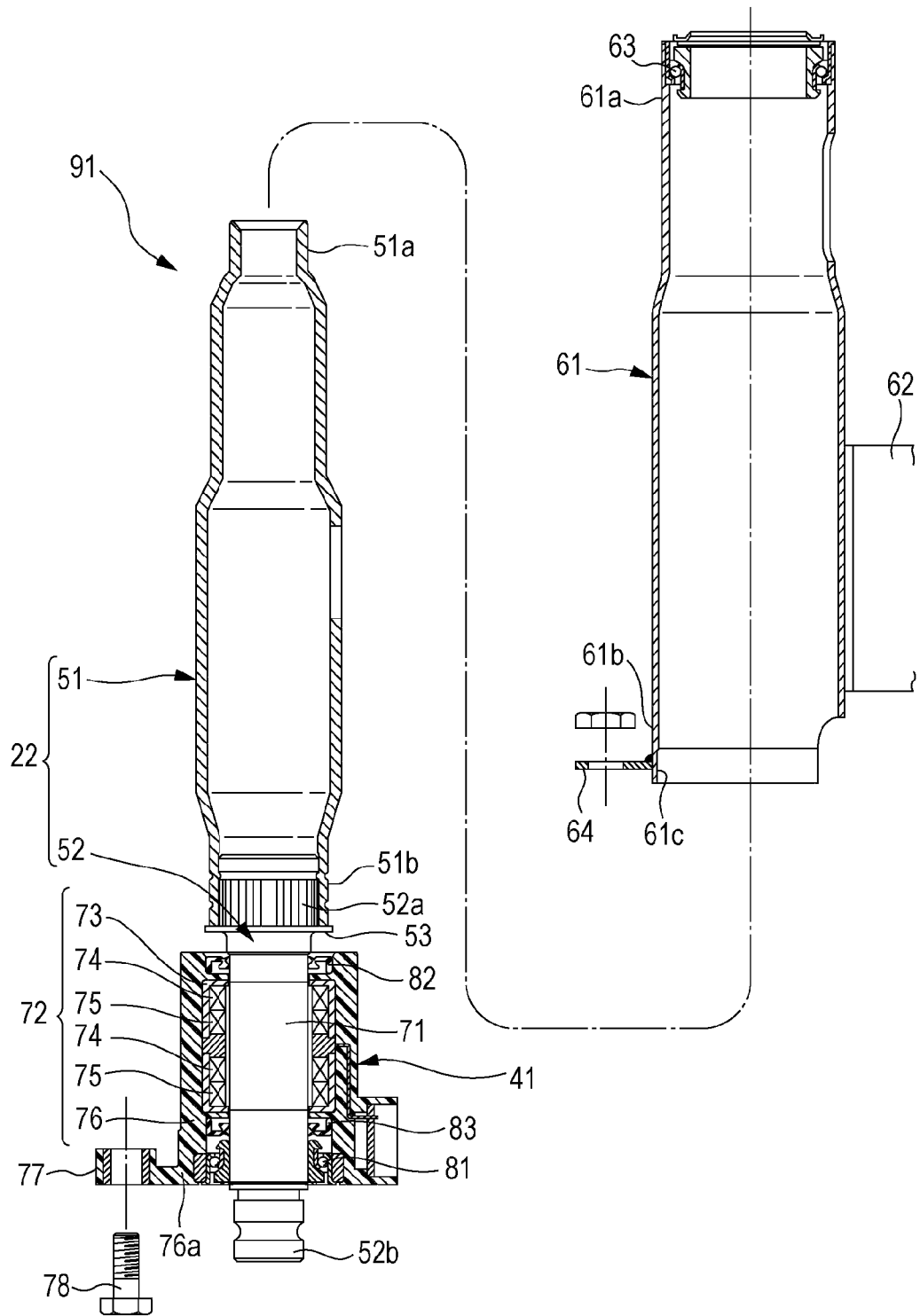
FIG. 5 is an explanation view illustrating a step of inserting the torque sensor illustrated in FIG. 4 to the column pipe with the torque sensor being attached to the column shaft.

Next, the magnetic change detector 72 is attached to the column shaft 22 to obtain a semi-finished product 91 illustrated in FIG. 5 (a step of obtaining a semi-finished product). When the semi-finished product 91 is obtained, the torque sensor 41 is obtained.

Then, the semi-finished product 91 is inserted into the column pipe 61 in the axial direction through the opening 61c at the axial end of the column pipe 61. Then, the semi-finished product 91 is fixed to the column pipe 61 by the bolt 78 (a step of obtaining a finished product) as illustrated in FIG. 2.

The column shaft 22, the torque sensor 41, and the column pipe 61 are fitted together as described above, which is one step of producing the power steering apparatus 10. In short, the column shaft 22 and the magnetic change detector 72 are attached to each other in advance, and then inserted and attached to the column shaft 61.

As described above, in the assembling of the torque sensor 41, the magnetic change detector 72 and the column shaft 22 are fitted together in advance to obtain the semi-finished product 91. Then, the semi-finished product 91 is inserted into and attached to the column pipe 61. In this configuration, at the stage of the semi-finished product 91, the magnetically variable portion 71 on the column shaft 22 (the magnetostrictive film 71 on the surface of the column shaft 22, for example) is surrounded by the magnetic change detector 72. With this configuration, the magnetic change detector 72 protects the magnetically variable portion 71 such that the magnetically variable portion 71 is not damaged in the assembling of the torque sensor 41.

In addition, as described above, the semi-finished product 91, in which the magnetic change detector 72 is attached to the column shaft 22, is inserted into and attached to the column pipe 61. This enables the center of the magnetic change detector 72 with respect to the column pipe 61 to be determined simply by attaching the column shaft 22 to the column pipe 61 through the bearings 63, 81. Thus, the assembling accuracy of the torque sensor 41 is sufficiently improved, and the detection accuracy of the torque sensor 41 is further improved and stabilized.

Figure 6:
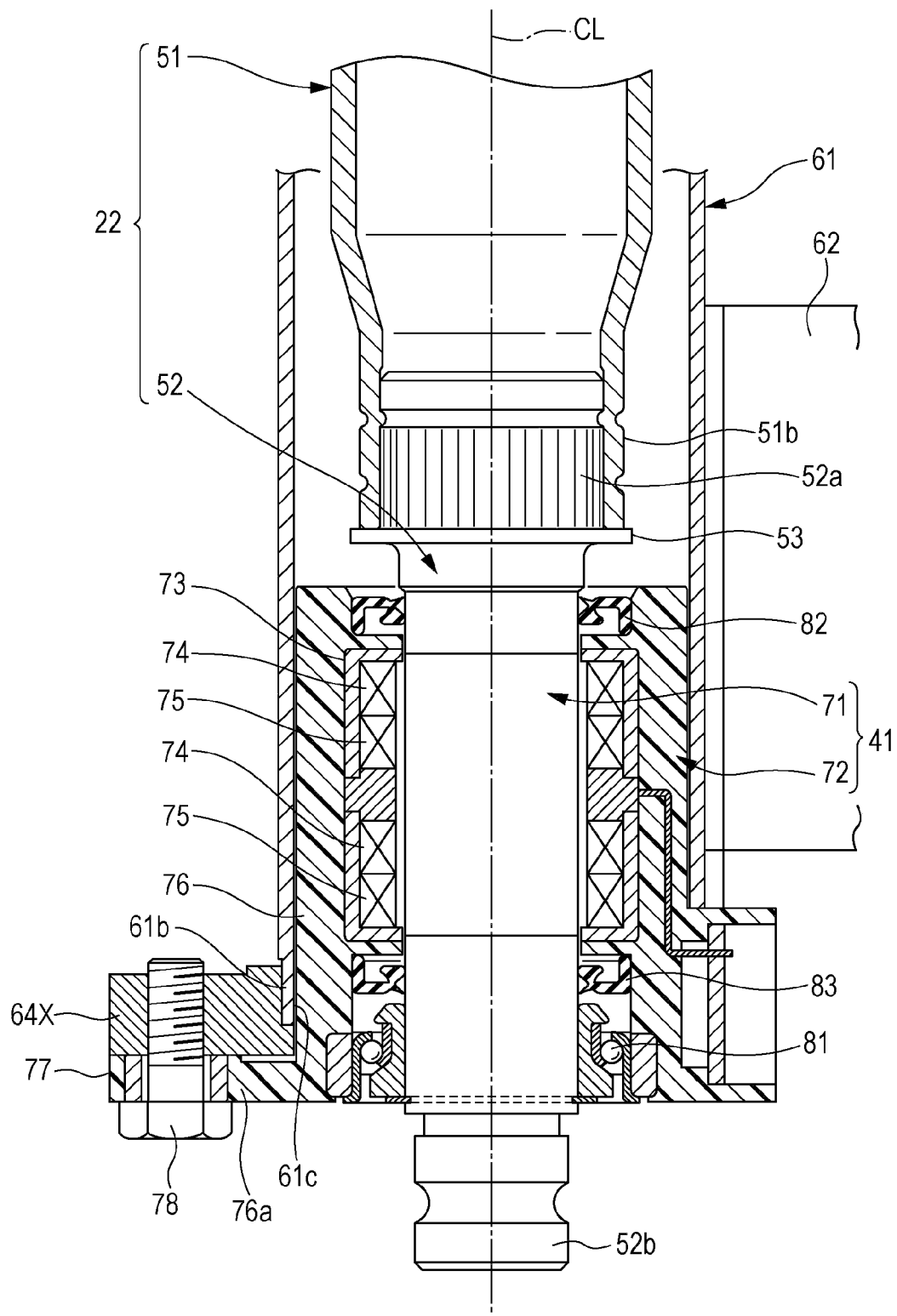
FIG. 6 is a view illustrating a modification of the column pipe illustrated in FIG. 3.

FIG. 6 illustrates a modification of the column pipe 61 illustrated in FIG. 3. As described above, the column pipe integrally includes the flange 64 at the second end portion 61b thereof, as illustrated in FIG. 3, by welding, for example. In the modification, the flange 64 is modified to a flange 64X as illustrated in FIG. 6. Specifically, the flange 64X in FIG. 6 is made of steel or aluminum (including an aluminum alloy such as a die-cast aluminum). The flange 64X is integrally formed on the outer peripheral surface of the second end portion 61b of the column pipe 61, which is a steel pipe, by press fitting.

Second Embodiment

Figure 7:
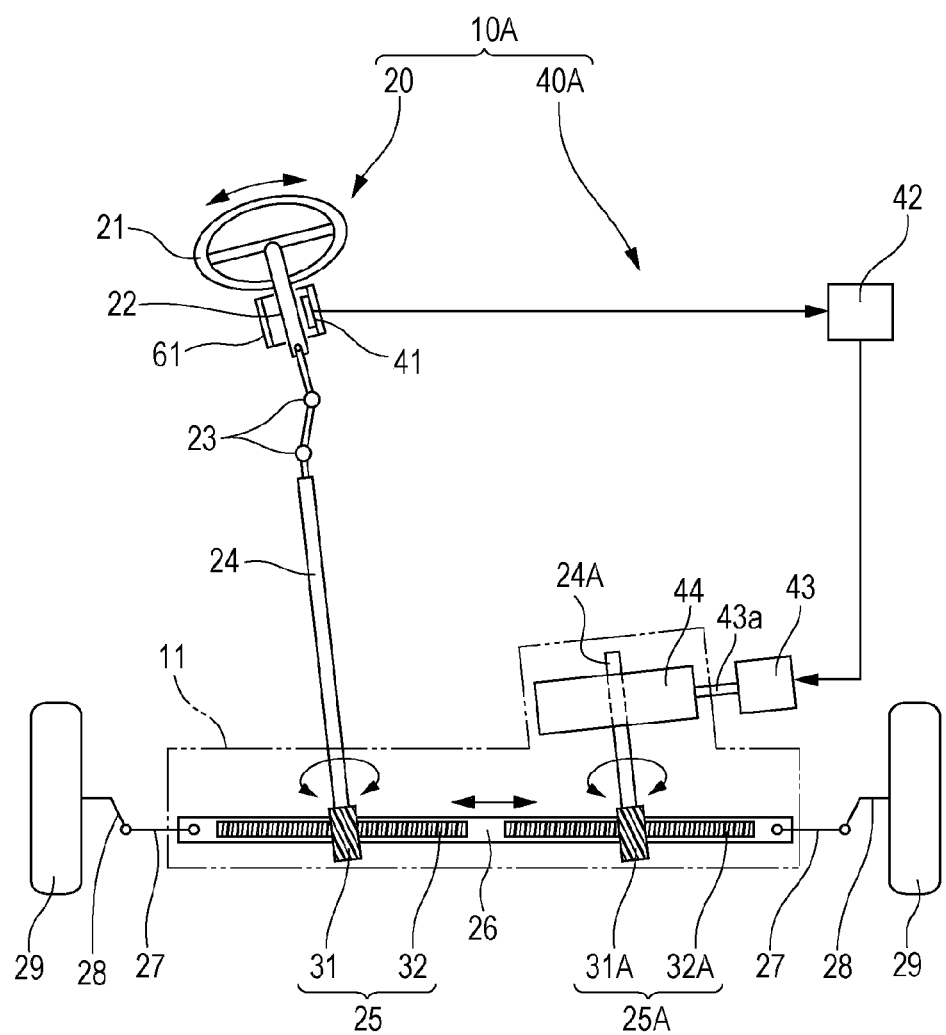
FIG. 7 is a schematic view of a power steering apparatus including a torque sensor according to a second embodiment of the present application.

A power steering apparatus for a vehicle according to a second embodiment will be described with reference to FIG. 7. FIG. 7 corresponds to FIG. 1 of the first embodiment. A power steering apparatus for a vehicle 10A in the second embodiment includes an auxiliary torque mechanism 40A illustrated in FIG. 7, which is a modification of the auxiliary torque mechanism 40 in FIG. 1. The other components thereof are same as those in the first embodiment. The same components as those in the first embodiment are assigned the same reference numerals in the first embodiment and will not be described in detail.

The auxiliary torque mechanism 40A is configured to directly transmit the auxiliary torque generated by the motor 43 to the rack shaft 26. In the second embodiment, the pinion shaft 24 of the steering system 20 is referred to as a "first pinion shaft 24," and the rack and pinion mechanism 25 is referred to as a "first rack and pinion mechanism 25."

Specifically, in the auxiliary torque mechanism 40A of the second embodiment, the auxiliary torque generated by the motor 43 is transmitted to a second pinion shaft 24A through the worm gear mechanism 44, and then transmitted to the second rack and pinion mechanism 25A through the second pinion shaft 24A. The second rack and pinion mechanism 25A includes a pinion 31A provided on the second pinion shaft 24A and a rack 32A provided on the rack shaft 26. The rack shaft 26 is a rack shaft for both of the first rack and pinion mechanism 25 and the second rack and pinion mechanism 25A.

In the steering apparatus 10A, the road wheels 29, 29 are turned by the rack shaft 26 by using the composite torque, which is a combination of the steering torque generated by a driver and the auxiliary torque of the motor 43. The power steering apparatus 10A of the second embodiment is called a "dual-pinion-assist electric power steering," since the power steering apparatus 19A includes two pinion shafts 24 and 24A.

The steering apparatus 10A of the second embodiment has the same effects and advantages as the steering apparatus 10 of the first embodiment.

Third Embodiment

Figure 8:
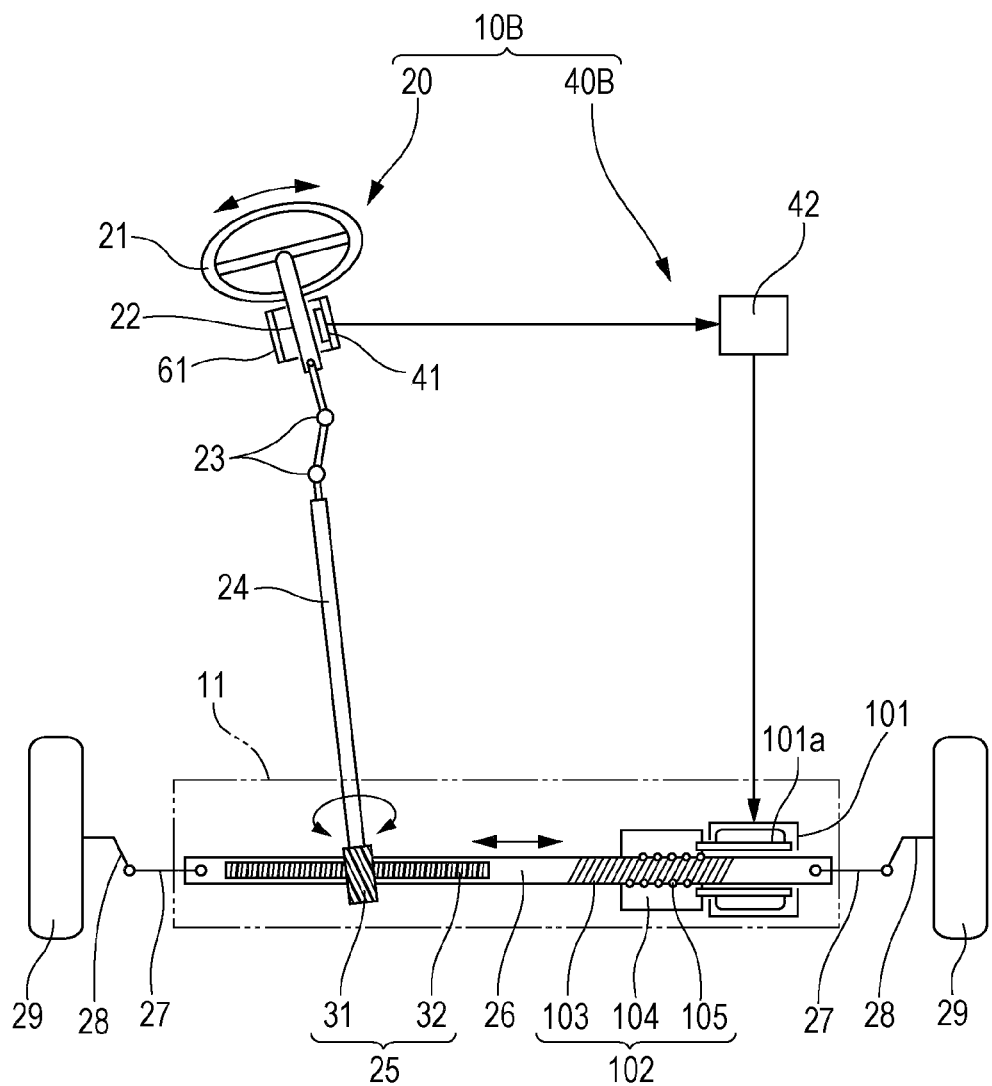
FIG. 8 is a schematic view of a power steering apparatus for a vehicle including a torque sensor according to a third embodiment of the present application.

A power steering apparatus according to a third embodiment will be described with reference to FIG. 8. FIG. 8 corresponds to FIG. 1 of the first embodiment. A power steering apparatus for a vehicle 10B of the third embodiment includes an auxiliary torque mechanism 40B illustrated in FIG. 8, which is a modification of the auxiliary torque mechanism 40 illustrated in FIG. 1. The other components thereof are same as those in the first embodiment. The same components as those in the first embodiment are assigned the same reference numerals in the first embodiment and will not be described in detail.

The auxiliary torque mechanism 40B includes a motor 101 illustrated in FIG. 8, instead of the motor 43 illustrated in FIG. 1, and a ball screw 102 illustrated in FIG. 8, instead of the worm gear mechanism 44 illustrated in FIG. 1.

Specifically, the auxiliary torque mechanism 40B is configured such that the auxiliary torque generated by the motor 101 is directly transmitted to the rack shaft 26 by the ball screw 102. A motor shaft 101a of the motor 101 is a hollow shaft surrounding the rack shaft 26. The ball screw 102 is a torque transmission mechanism including a screw section 103, which is a part of the rack shaft 26 other than the rack 32, a nut 104 attached to the screw section 103, and a plurality of balls 105 positioned between the screw section 103 and the nut 104. To the nut 104, the motor shaft 101a is connected.

In the steering apparatus 10B, the road wheels 29, 29 are turned by the rack shaft 26 by using the composite torque, which is a combination of the steering torque by a driver and the auxiliary torque of the motor 101. The power steering apparatus for a vehicle 10B according to the third embodiment is referred to as a "rack-shaft-assist electric power steering," since the auxiliary torque generated by the motor 101 is directly transmitted to the rack shaft 26.

The steering apparatus 10B of the third embodiment has the same effects and advantages as the steering apparatus 10 of the first embodiment.

The power steering apparatus 10, 10A, or 10B of this application is preferably applied to an automobile.

What is claimed is:

1. A power steering apparatus for a vehicle, comprising:
   a steering wheel;
   a column shaft connected to the steering wheel;
   a column pipe having an opening at a lower axial end thereof and rotatably supporting the column shaft through a plurality of bearings at locations axially apart from one another, the column pipe being a steel pipe; and
   a torque sensor which comprises,
      a magnetostrictive portion disposed on the column shaft in such a manner that a magnetic permeability of the magnetostrictive portion varies in response to a torque generated on the column shaft, and
      a detector configured to detect a change in the magnetic permeability of the magnetostrictive portion, the detector being provided to an inside of the column pipe by being inserted into the opening of the column pipe at the lower axial end thereof, the detector being located between the plurality of bearings such that at least one of the bearings is provided at a side of the opening of the column pipe,
   wherein the first shaft is a cylindrical hollow shaft, and the second shaft is a solid shaft.

2. The power steering apparatus according to claim 1, further comprising a resin molding, wherein the detector and said at least one of the bearings is integrally incorporated into one body with the resin molding.

3. The power steering apparatus according to claim 1, wherein the column shaft comprises a first shaft and a second shaft axially connected to the first shaft.

4. The power steering apparatus according to claim 3, wherein the detector is mounted to the second shaft.

5. The power steering apparatus according to claim 1, wherein the detector is located at a lower side of the column pipe.

6. A method of producing a power steering apparatus comprising: a steering wheel; a column shaft connected to the steering wheel; a column pipe having an opening at a lower axial end thereof and rotatably supporting the column shaft through a plurality of bearings at locations axially apart from one another, the column pipe being a steel pipe; and a torque sensor which comprises a magnetostrictive portion disposed on the column shaft in such a manner that a magnetic permeability of the magnetostrictive portion varies in response to a torque generated on the column shaft, and a detector configured to detect a change in the magnetic permeability of the magnetostrictive portion, the detector being provided to an inside of the column pipe by being inserted into the opening of the column pipe at the lower axial end thereof, the detector being located between the plurality of bearings such that at least one of the bearings is provided at a side of the opening of the column pipe, the method comprising:

providing at least the column shaft to which the magnetostrictive portion is provided, the column pipe, and the detector;

mounting the detector to the column shaft at a position where the magnetostrictive portion is provided, thereby assembling the torque sensor with magnetostrictive portion and the detector; and then, inserting the column shaft with the torque sensor into the column pipe through a lower axial end thereof to a position where the column pipe houses the torque sensor therein, the column pipe rotatably supporting the column shaft through a plurality of bearings in such a manner that the detector is located between the plurality of bearings at least one of which is provided at a side of the lower axial end of the column pipe.

7. The method according to claim 6, wherein the column shaft comprises a first shaft and a second shaft axially connected to the first shaft.

8. The method according to claim 7, wherein the first shaft is a cylindrical hollow shaft, and the second shaft is a solid shaft.

9. The method according to claim 8, wherein the detector is mounted to the second shaft.

10. The method according to claim 6, wherein the detector is located at a lower side of the column pipe.

* * * * *